United States Patent
Willett et al.

(10) Patent No.: US 10,372,117 B2
(45) Date of Patent: Aug. 6, 2019

(54) SYSTEMS AND METHODS FOR ASSURING AND IMPROVING PROCESS QUALITY

(71) Applicants: TOYOTA MOTOR EUROPE NV/SA, Brussels (BE); TOYOTA JIDOSHA KABUSHIKI KAISHA, Toyota-shi, Aichi-ken (JP)

(72) Inventors: Andrew Willett, Schaerbeek (BE); Tomoya Okazaki, Toyota (JP); Shingo Iwatani, Nagoya (JP)

(73) Assignees: TOYOTA MOTOR EUROPE NV/SA, Brussels (BE); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 385 days.

(21) Appl. No.: 14/905,105

(22) PCT Filed: Jul. 18, 2013

(86) PCT No.: PCT/EP2013/065237
§ 371 (c)(1),
(2) Date: Jan. 14, 2016

(87) PCT Pub. No.: WO2015/007322
PCT Pub. Date: Jan. 22, 2015

(65) Prior Publication Data
US 2016/0139593 A1    May 19, 2016

(51) Int. Cl.
*G05B 19/418* (2006.01)
*B23K 26/03* (2006.01)
(Continued)

(52) U.S. Cl.
CPC ...... *G05B 19/41875* (2013.01); *B23K 26/032* (2013.01); *B23K 26/282* (2015.10);
(Continued)

(58) Field of Classification Search
CPC ............... G05B 19/41875; G05B 2219/32179
See application file for complete search history.

(56) References Cited

U.S. PATENT DOCUMENTS 6,670,574 B1 * 12/2003 Bates .................... B23K 26/03
                                                                219/121.63
6,791,057 B1      9/2004 Kratzsch et al.
(Continued)

FOREIGN PATENT DOCUMENTS

| EP | 1415755 A2 | 5/2004 |
| JP | 06-126475 A | 10/1994 |
| WO | 2011/120672 A2 | 10/2011 |

*Primary Examiner* — Tri M Hoang
(74) *Attorney, Agent, or Firm* — Hunton Andrews Kurth LLP

(57) ABSTRACT

A system for evaluating at least one state of a process is provided the system having means for segmenting the process into a plurality of process segments, one or more sensors configured to capture information related to each process segment of the plurality of process segments generated by the segmenting means, the information comprising a plurality of samples, and processing means configured to process the plurality of samples related to each process segment of the plurality of segments, and, based on the processing, provide an indication associated with the at least one state of the process.

21 Claims, 10 Drawing Sheets

(51) Int. Cl.
*B23K 31/12* (2006.01)
*G06T 7/00* (2017.01)
*B23K 26/282* (2014.01)
*B23K 101/06* (2006.01)

(52) U.S. Cl.
CPC .......... *B23K 31/125* (2013.01); *G06T 7/0004* (2013.01); *B23K 2101/06* (2018.08); *G05B 2219/32179* (2013.01); *G06T 2207/30152* (2013.01); *Y02P 90/14* (2015.11); *Y02P 90/22* (2015.11)

(56) References Cited

U.S. PATENT DOCUMENTS

| | | |
|---|---|---|
| 7,129,438 B2 | 10/2006 | Bates et al. |
| 2014/0150953 A1* | 6/2014 | Sieben ................ B29C 65/1638 156/64 |

* cited by examiner

SYSTEMS AND METHODS FOR ASSURING AND IMPROVING PROCESS QUALITY

CROSS-REFERENCE TO RELATED APPLICATION

This is a national phase application based on the PCT International Patent Application No. PCT/EP2013/065237 filed Jul. 18, 2013, the entire contents of which are incorporated herein by reference.

FIELD OF THE DISCLOSURE

The present disclosure is related to systems and methods for assuring quality during manufacturing, and more particularly to an automated system for segmenting, capturing, analyzing, and determining a state based on process data.

BACKGROUND OF THE DISCLOSURE

During manufacturing processes numerous operations may occur, each of these operations affecting quality of the final product. In order to ensure quality during such manufacturing processes techniques have been developed to monitor the processes and to enable data obtained during such monitoring to be analyzed to determine whether certain quality thresholds were or are being met.

For example, light emissions from processes can be captured to provide data regarding a quality state of a process by using photo-sensitive devices that are sensitive to different wavelength ranges of the electromagnetic spectrum (e.g. visible, near infrared, infrared). Alternatively, or in addition, a filter can be placed in front of the device in order to selectively block certain wavelengths while allowing certain other wavelengths for analysis to pass to the sensing device. For example, this may be done where a particular phenomenon is visible at a specific wavelength. In addition, it may be desirable to block out wavelengths that may damage the sensing device.

The light emissions detected by the sensor can reveal different phenomenon and artifacts that can be linked to different quality features.

In laser welding for example, pyrometers can be used to capture point data over time and are available from, for example, Precitec, Plasmo, and 4D currently have commercialized solutions on the market. Further, image capture devices such as CMOS and CCD cameras are commonly used to gather two dimensional data regarding the geometry and features of a weld pool and process zone, with, for example, Precitec and Prometec currently providing commercialized solutions.

Active illumination by lasers or light emitting diodes may be used in addition to image capture devices for reasons such as enhancing the image capture capability, and enabling lower exposure times and faster frame rates. For example, Lessmueller and Cavitar provide solutions suitable for such uses.

More recently there has been growth in multi-sensor, single-sensor multi-wavelength techniques, and monitoring of specific wavelengths/bandwidths to capture phenomenon that can generally only be reliably detected at specific wavelengths.

Regardless of the image captured and the technique used, some form of identification and quantification of the artifacts in the images is required in order to implement quality control. The system from Precitec for example comes with two standard packages, ROI (regions of interest) and Qualas (based on thresholding).

Post-process inspection can also be performed using methods such as ultrasound, eddy current and thermography analyses. However, the need remains for a robust in-situ/inline monitoring method enabling the elimination of additional post-processing inspection.

Further, existing in-situ/inline monitoring techniques typically use a single image, and processing thereof, to determine, subjectively, the quality of a process at a given time in the process, and this determination may then be used to evaluate the quality of the process and/or to control the process.

U.S. Pat. No. 7,129,438 to Miyachi discloses the use of algorithms to extract single variable output from two-dimensional images of pulsed laser welding processes, noting that the systems on the market at that time did not offer sufficient image processing capability.

WO 2011/120672 teaches that process images can be used for the control of laser power in welding processes by decision making based on the presence of lack of image artifacts, in particular a full penetration keyhole.

Such approaches present problems, however. For example, in some dynamic processes, it is not necessarily the occurrence of a single defective state in a process that can cause a defect in the product, but rather the time over which the process operates in a defective state. In other words, analysis of the temporal and spatial distribution of defective states within the process or within a given portion of the process can better define the quality of the product.

In addition, other phenomenon occurring during the process (e.g. gas emissions, light irradiated by gas emissions that block viewing of the process phenomenon), and even dynamic random or periodic oscillation between states may cloud or block reliable imaging and fair judgment of the actual process state, and may therefore introduce difficulties on an image by image basis.

In such situations, and also especially for sensitive operations or parts, it may be preferred to not hand over power control to a closed loop system, and is instead preferable to implement a highly robust statistical analysis for monitoring, correction, and control approach based on processing of batches of images.

It is accordingly a primary object of the disclosure to provide systems and methods for overcoming the deficiencies of the currently available systems and methods by using temporal discretization of process analysis.

SUMMARY OF THE DISCLOSURE

Temporal discretization can be achieved by assigning images from a given sensor on a temporal basis to a specific portion or segment of the process. Therefore, according to embodiments of the present disclosure, a system for evaluating at least one state of a process is provided. The system includes means for segmenting the process into a plurality of process segments, one or more sensors configured to capture information related to each process segment of the plurality of process segments generated by the segmenting means, the information comprising a plurality of samples, and processing means configured to process the plurality of samples related to each process segment of the plurality of segments, and, based on the processing, provide an indication associated with the at least one state of the process.

Notably, each of the one or more sensors may have a different segment strategy and/or a single sensor can be used to detect multiple anomalies in the process, in which case a segment strategy may be different for each anomaly type.

The means for segmenting the process can be further configured to generate sub-segments for each process segment of the plurality of process segments.

The wavelengths and bandwidth received by the one or more sensors may be selectively shut out with a band-pass filter to give images of a specific feature or anomaly occurring in the scene but only visible within a certain wavelength range, and also to protect the sensor from reflected laser light, dangerous emissions, or high brightness emissions to certain regions of the sensor.

The system can include a database comprising anomaly data associated with one or more predetermined anomalies.

The one or more sensors may include a means for capturing radiation data, preferably, a camera. The camera may be configured to capture certain wavelengths of light based on the process being analyzed.

Each camera may have its own response characteristic at each wavelength. Therefore camera selection may be made so as to result in a camera profile having suitable characteristics for a given analysis. In some cases further configuration of the sensor or its sensitivity at a given wavelength or range of wavelengths may be possible.

Notably, one of skill in the art will understand that the term "camera" is to be interpreted broadly and may include any 2D and 3D imaging device.

The samples may comprise at least one of an image and a sound. According to embodiments of the disclosure, the processing means can be configured to analyze the plurality of samples associated with each segment and compare the analyzed information to the anomaly data to determine a segment state.

The system may include a user interface, the user interface being configured to enable customization of a set of parameters defining at least one of the plurality of segments, the samples, and the process.

The user interfaces can enable selection of a number of samples to be captured for each process segment and/or sub-segment, i.e., a sampling rate.

The one or more sensors may be configured to capture images in three-dimensions (3-D).

At least one sensor capturing spatially two-dimensional or three-dimensional images in, for example, the ultraviolet, visible, infrared (near infrared and far infrared) may be provided.

Two-dimensional images may be a representation of a planer two-dimensional scene, or a two-dimensional representation of three-dimensional scene.

Three-dimensional images may be created by a single sensor assisted by optics, or a plurality of sensors operating in the same wavelength.

The processing means can be configured to generate comparative data related to the plurality of samples based on one or more algorithms, and to store the comparative data in the database.

The one or more sensors can also configured to capture information associated with both a workpiece subject to the process and equipment performing the process on the part.

The process can be an assembly process, for example, a welding process. The process may also include a composite curing process, a composite consolidating process, a powder cladding process, a powder spray process, a spray process, a brazing process, a composite tape laying process, a composite comingled fibre placement process, a heating and drying process among others.

The scene viewed by one or more sensors, according to some embodiments, may emit radiation (e.g., light) due to ambient or environmental illumination of the scene, process light emissions (response of the part to process excitation), or additional external illumination at a selected wavelength or group of wavelengths, or external excitation, (or a combination of such factors).

The sampling frequency of the one or more sensors is high enough to make statistical determinations across a batch of successive images (i.e., a segment) regarding the occurrence of characteristics of a predefined feature or anomaly occurring at the defined wavelength and bandwidth in the observed process.

The one or more sensors may be located coaxially to the process. The one or more sensors may also view the process zone from fore, aft, left, right, or any practical combination thereof. The one or more sensors may also capture the images through a remote laser scanner used for the process.

The one or more sensors may view the workpiece being processed either in its entirety or locally at the process zone or other indicative zone relevant for process monitoring.

The one or more sensors may view a part of the equipment (e.g. tools, fixtures), or the interface between the workpiece and equipment, rather than the just the workpiece itself.

The one or more sensors may view entirely different parts of the same scene. Sensors viewing the same scene may or may not share the same field of vision.

The system may use, in addition, or as an alternative to one or more sensors, techniques such as in-situ X-ray, neutron radiography, and terahertz spectroscopy. An array detector such as an ultrasound array, or where a 2-dimensional representation of a dynamic process is formed by the combination of multiple single point measurements, may also be implemented.

According to embodiments of the disclosure, a method for evaluating at least one state of a process is provided. The method includes segmenting the process into a plurality of process segments, capturing information related to each process segment of the plurality of process segments, the information comprising a plurality of samples, processing the plurality of samples related to each segment of the plurality of process segments, and providing, based on the processing, an indication associated with the at least one state of the process.

The method may further include sub-segmenting each of the plurality of process segments into a plurality of sub-segments.

The method may further include specifying a set of parameters defining at least one of the plurality of segments, the samples, and the process.

The processing may include applying one or more algorithms to the plurality of samples to result in data points.

The one or more algorithms may be selected from at least one of a maximum determining algorithm, a minimum determining algorithm, an average determining algorithm, a slope determining algorithm, an integral algorithm, a summing algorithm, logic actions, masking functions, local thresholding, global thresholding, adaptive thresholding, inversing the image, filling parts of the image, opening parts of the image, and noise spot removal, among others.

The segmentation may be spatial, temporal, or spatio-temporal.

A number of segments comprising the plurality of segments can be configured based on the process such that a statistically significant result may be obtained.

The method may further comprise a user configuration step, wherein a user may configure at least one of the number of segments and a statistical state associated with a physical defect.

The process is an assembly process, for example, a welding process. The process may also include a composite curing process, a composite consolidating process, a powder cladding process, a powder spray process, a spray process, a brazing process, a composite tape laying process, a composite comingled fibre placement process, a heating and drying process among others.

Importantly, a complete collection of samples (e.g., images) may be saved in memory (e.g., RAM or persistent associated with a processor) either temporarily or permanently for user reference and/or audit of system accuracy. For example, the collection of samples may be stored on a local hard drive, a network drive, and/or a cloud drive, among others. This may enable a user to rerun an analysis with different parameters when desired.

Image features detected may be highlighted in the images for user reference, audit of system accuracy, rerunning analysis with different parameters when desired and system continuous improvement.

The image features detected in each image may be stored in the form of numeric data, lists, spreadsheets, and/or a database for reference and post-analysis.

Segment data summaries can be produced from the numerical data (e.g. lists, spreadsheets, database) and can be visualized in charts and graphs, which may also include visualization of the statistical testing and/or failure criterion. Segment data and images contributing to the charts and graphs can be readily retrieved, displayed, and exported to reports.

Images (with or without highlighting) can be played back as image stacks or movies. The user and developer can readily cross-reference between images and numeric data (e.g. lists, spreadsheets, database).

The user or developer can redefine the segmentation of the part, product, or process in terms of the number of segments, number of images contributing to each segment, and the image capture frequency, parameter and image processing algorithm (and parameters thereof) for each segment in order to obtain the optimum settings for statistical significance testing between the different quality states.

According to embodiments of the disclosure, a system for evaluating at least one state of a process is provided. The system includes a processor configured to segment the process into a plurality of process segments and one or more sensors configured to capture information related to each process segment of the plurality of process segments generated by the segmenting means and provide the information to the processor, the information comprising a plurality of samples. The processor is further configured to process the plurality of samples related to each process segment of the plurality of segments, and based on the processing, provide an indication associated with the at least one state of the process.

Output associated with the processing of each sample of the plurality of samples comprises a single numeric value, while an output associated with the processing of each segment of the plurality of process segments is a function of the single numeric values.

The system may further comprise a database containing anomaly data associated with one or more predetermined anomalies.

The one or more sensors may include a camera and/or an array of acoustic transducers (e.g., microphones) configured to capture radiation and/or acoustic data, and the plurality of samples can include at least one of an image and a sound.

The system may further include a band pass filter configured to selectively transmit radiation data within a predetermined wavelength or group of wavelengths and to prevent transmission of radiation data outside of the predetermined wavelength.

The system can include a user interlace, the user interface being configured to enable customization of a set of parameters defining at least one of the plurality of segments, the samples, and the process.

The one or more sensors may be configured to capture images in three-dimensions.

The database can further include comparative data related to the plurality of samples based on one or more algorithms.

The system may include a storage device configured to store one or more of the plurality of samples captured during the process, and for outputting one or more of the plurality of samples in a format visible and/or audible to a human user.

It is intended that combinations of the above-described elements and those within the specification may be made, except where otherwise contradictory.

For purposes of the present disclosure, the terms "segment," "segmentation," "segmenting" and variations thereof shall mean the process of partitioning a process and/or information into meaningful elementary parts termed "segments."

The term "spatial segmentation" shall mean partitioning an image, e.g., a still image or a frame, to a number of arbitrarily shaped regions, each of them typically being assumed to constitute a meaningful part of the image, i.e. to correspond to one of the objects depicted in it or to a part of one such object. The term "global spatial segmentation" shall mean spatial segmentation of the entire process area, including areas outside the initial view of the one or more sensors. According to some embodiments, global spatial segmentation may be implemented and the analysis may be triggered as the field of view moves to a specific spatial position.

Further, the term "temporal segmentation" shall mean assigning images from a time dependent series of images e.g., a video image to a specific segment.

DESCRIPTION OF THE EMBODIMENTS

Figure 1:
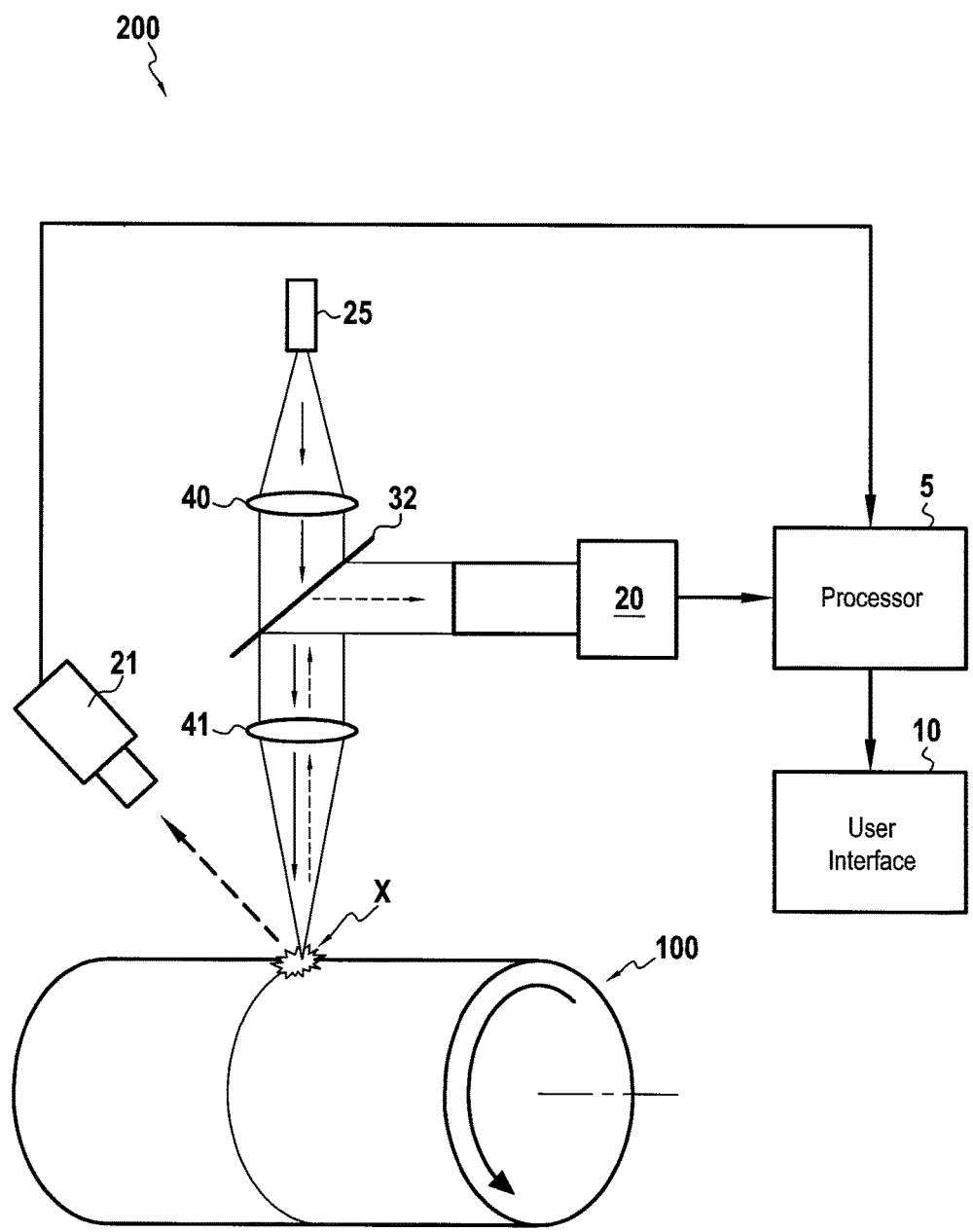
FIG. 1 is a block diagram of an exemplary hardware configuration according to embodiments of the present disclosure.

FIG. 1 is a block diagram of an exemplary hardware configuration for monitoring at least one state of a process according to embodiments of the present disclosure. It is noted that while this exemplary description relates to monitoring a laser welding process, this is not intended to be limiting, and the systems and methods may be implemented to monitor and determine a state of any number of processes.

As shown at FIG. 1, the system may include a processor 5, a user interface 10, one or more sensors 20, 21, a light delivery device 25 (e.g., fiber, mirror, etc), one or more lenses 40, 41 including a collimator 40, and a mirror 32. Not shown at FIG. 1 is a light-providing device (e.g., a laser).

Processor 5 may comprise any type of hardware and software suitable for receiving, collecting, processing, and storing data, among other things. For example, processor 5 may include various components such as random access memory (RAM), persistent memory (e.g., a hard drive, SD memory, etc.), a numeric processor (e.g., Intel Core processor, AND Opteron processor), and data buses configured to transmit data within processor 5. Processor 5 may further comprise instructions stored in persistent memory and configured to enable processor 5 to operate and interface with a user (i.e., an operating system).

Processor 5 may also include one or more interfaces enabling transmission and reception of data to and from one or more sensors 20, 21. Such interlaces may comprise for example, USB, Firewire, Lightning, Thunderbolt, serial, PCI, and any other suitable interface for receiving and transmitting data. For example, a sensor provided with WiFi or wired network capabilities (LAN) may interface with processor 5 via WiFi or wired network interfaces.

One or more sensors 20, 21 may comprise, for example, cameras (e.g., CCD, CMOS, SMART, etc), infrared (IR) sensors, ultraviolet (UV) sensors, acoustic transducers, and one or more interfaces configured to enable communications between, for example, one or more sensors 20, 21 and processor 5, among other things. One of skill will recognize that, for example, where a SMART camera is used, certain portions of processing may be performed by the SMART camera while other portions may be performed by processor 5, as desired.

One or more sensors 20, 21 may be similar devices (e.g. cameras) or may be a collection of any number of diverse sensors (e.g., a camera, a microphone, and a UV sensor). According to some embodiments a single camera is provided, while according to other embodiments, two or more cameras are provided.

Where one or more sensors 20, 21 comprise one or more cameras, such cameras may be configured and/or optimized for capturing different light wavelengths, depending on the configuration of the system and the process to be monitored. In order to achieve such configurations optics, filters, and capture elements may be varied for each camera. In addition, the system and/or one or more sensors 20, 21 may be provided with one or more band pass filters configured to permit or deny passage of certain wavelengths of light based on the desired configuration. One of ordinary skill will understand that such band-pass filters may also be implemented with regard to sound and other radiant energy sources.

Beam delivery device 25 may comprise any suitable element for delivering and directing light radiation. For example, beam delivery device 25 may comprise a fiber-optic cable, a waveguide, and/or a light radiation generator (e.g., a laser).

A mirror 32 (e.g., a one-way mirror) may be disposed between beam delivery device 25 and a workpiece 100. Such a configuration may enable light emitted by beam delivery device 25 to pass through one-way mirror 32 on its way to the workpiece 100, while light emitted (e.g., reflected) from workpiece 100 may be reflected by mirror 32 towards one or more sensors 20, 21, as shown at FIG. 1 by the directional arrows.

In order to facilitate this process one or more lenses 40, 41 may be implemented within the system. For example, a collimator 40 may be disposed between beam delivery device 25 and one-way mirror 32, with a focal lens 41 disposed between one-way mirror 32 and workpiece 100. In so doing, the one or more lenses 40, 41 may enhance both the process beam (i.e. the beam of light performing action on workpiece 100) and the reflected beam of light (i.e. light reflected as a result of action on the workpiece 100).

As shown at FIG. 1 at least one of the one or more sensors 20, 21 may be positioned to capture the light reflected by one-way mirror 32. Additionally, another sensor 21 may be positioned at an angle offset from a work position X on workpiece 100, so as to capture acutely reflected light from workpiece 100. One or more sensors 21 may be placed at any position desired and suitable for capturing desired data.

User interface 10 may comprise input and output devices (hardware and/or virtual) such as, for example, a display, a pointing device, and a keyboard. One of skill in the art recognizes that a plethora of processing devices are available (e.g., tablets, PCs, laptops, smart phones, etc.) and that any such device may be implemented as processor 5 providing user interface 10. Such elements may be configured operate with the operating system executed by processor 5.

In addition user interface 10 may enable interaction with one or more programs configured interface with system 200. For example such programs may comprise analysis programs, capture programs, set up programs, etc. Importantly, such programs may be included all within one application or maybe individual applications to be executed by user.

According to the present disclosure, at least one application may be provided for user to define aspects of the state determination related to the process with regard to workpiece 100 using system 200. For example, a user may define the process to be conducted, how a process should be segmented (e.g., number of segments, segment interval, number of images per segment, etc), algorithms associated with segmenting the process, among others.

Additionally, user interlace 10 may enable the user to choose from a selection of predefined image analysis algorithms and adjust parameters thereof, or program/define new image processing algorithms (and parameters thereof) to be applied to each sensor 20, 21, samples N assigned to a segment S, and set the parameters thereof. Such selections may be made for each sensor 20, 21, each sample N, and each segment S, alternatively, a default set to apply across all sensors 20, 21, samples N, and segments S, or any combination thereof.

User interface 10 may also enable, for each sensor 20, 21, sample N, segment S, and image processing algorithm, selection of predefined statistical testing methods and/or definition of new statistical testing methods to be applied, as well as setting the parameters thereof. Examples of such statistical testing may include hypothesis testing, distribution analysis, scatter analysis, clustering analysis, patterning of pass and fail states within a segment, etc.

During a development/setup stage, user interlace 10 may enable previously obtained segment data (e.g., segment summaries) to be compared with actual physical (mechanical, material, metallurgical, chemical) features in development stage parts for generating predefined statistical quality control criteria for each segment S of the workpiece 100 and/or process. Such segment summaries can be used to make statistical significance testing against these predefined quality control criteria for production parts.

A user or developer may also "teach" system 200 what statistical states correspond to physical defects by using defects that occur as the outcome of a process or by using preprogrammed defect scenarios. Processor 5 may then iterate through such information in order to optimize segmentation strategy for achieving improved statistical significance. In addition, this process could also be performed manually by the user or developer.

Importantly, samples N and segments S may be traced back to specific positions on the workpiece, or timestamps in the process, and user interface 10 may enable a user to specify whether specific positions should be physically or diagrammatically marked on the workpiece (or a representation thereof) by the equipment.

In addition there may be a trigger between process start/stop and data capture start/stop in order to initiate and synchronize a position of the workpiece and segments. For example a time or position could be used, and/or a specific feature of the part or a marker that is detected by the sensor may be used.

While embodiments of the present disclosure are generally described with regards to light capturing techniques, one of skill in the art will understand that these techniques described herein can similarly be applied to audio capture, X-ray capture, etc.

Figure 2:
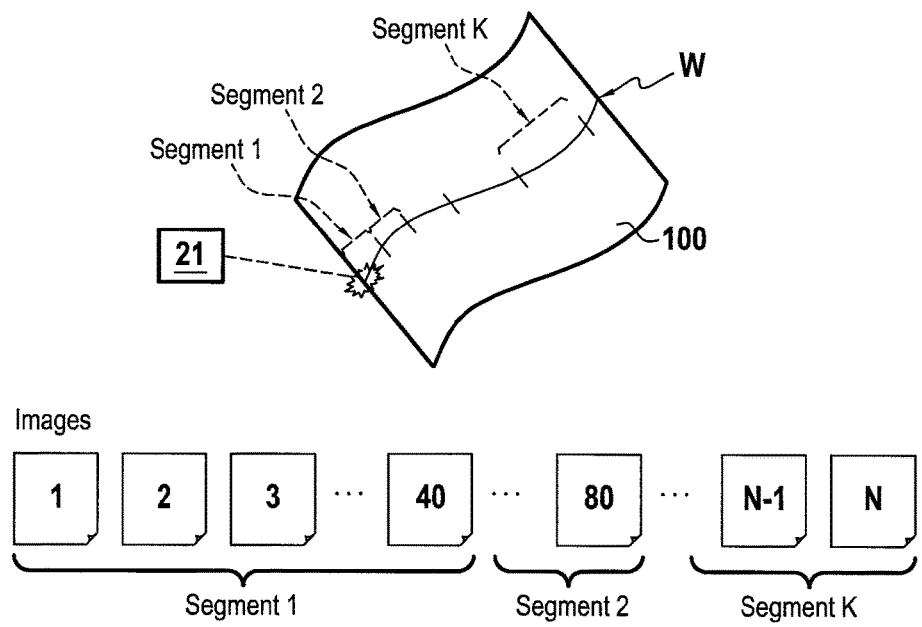
FIG. 2 is an exemplary diagram showing segmentation of the process according to embodiments of the present disclosure.

FIG. 2 is an exemplary diagram showing segmentation of the process according to embodiments of the present disclosure. As shown the process may be separated into one or more virtual segments 1, 2, . . . K, and where desired, sub-segments thereof. The number of segments may depend on, for example, the length of the process, the length of workpiece 100, a desired segment size, statistical methods used to analyze each segment, etc.

Each segment, and sub-segments, where implemented, may contain a predefined number of samples (e.g., image samples, sound samples, etc), for example, 1, 2, . . . N samples. Such samples may be captured by one or more sensors 20, 21 providing data to processor 5 during processing (e.g. welding, fabrication, assembly, etc.) of a workpiece 100.

In order to define the predefined number of samples for a segment and/or sub-segments, an operator and/or an engineer developing the process may determine a suitable number based on, for example, the number of samples desired to give a statistically significant difference between physical defect occurrence or lack thereof. For example, the sampling frequency of one or more sensors should be high enough to make statistical deductions across a batch of successive images within a segment, regarding the occurrence of characteristics of a predefined image feature or anomaly occurring at the defined wavelength and bandwidth in the observed process.

During execution of the process this information may then be used to determine a "sampling rate" for samples within each segment and/or sub-segment. For example, where an imaging algorithm is to be used, and a predetermined number of images has been determined to be 10 (e.g., to give statistically significant results), one or more sensors 20, 21, comprising cameras, infrared sensors, UV sensors, etc., may capture 40 images per segment over the course of the process. Each of the one or more sensors 20, 21 may have a different segment strategy and/or a single sensor can be used to detect multiple anomalies in the process, in which case a segment strategy may be different for each anomaly type.

Processor 5 may be configured to cause and control capture of samples (e.g., image samples, audio samples, etc.) during processing of workpiece 100, as well as to process such samples following the capture thereof. For example, where an imaging capture system is implemented, processor 5 may cause the capture of a predetermined number of images (i.e., samples) for each defined segment and/or sub-segment by one or more sensors 20, 21 as described above during processing of workpiece 100. Such images may be still images, video images, and any combination thereof.

During the capturing of samples, filters, lenses, and other devices may be utilized for maintaining and/or modifying a signal received by one or more sensors 20, 21 and/or processor 5. For example, during a welding process it may be desirable to monitor workpiece 100 at work position X for the occurrence of spatter. Therefore, an operator may have predefined 50 samples per segment, the samples being images at work position X to be obtained by one or more sensors 20, 21 and provided to processor 5. Spatter may be particularly evident at certain wavelengths and therefore, such wavelengths may be targeted for capture by one or more sensors 20, 21.

Based on this information, and as shown at FIG. 2 as the welding process proceeds along weld seam W one or more sensors 20, 21 are caused to capture 50 images over the course of the predefined segments. Each of these images is then stored within memory associated with processor 5 for later processing (described in greater detail below).

Following the capture of samples, each image may be processed by processor 5 by applying one or more image processing algorithms to extract numerical data regarding key features in the image. For example, such features may provide a single numerical output (e.g., Boolean/binary) regarding presence or lack of a predefined image artifact, a geometrical measurement, an intensity value and/or a set of statistical data regarding a distribution or summary of intensity values within a single or multiple regions of interest of varying shape and size within each image of each segment. A Boolean or binary single numerical output may be generated, for example, by using a threshold value that when exceeded renders a first result and when not exceeded a second result. In addition, if desired a tertiary system may be implemented, where when a threshold is equaled a third result is obtained. One of skill in the art will recognize that varying result outputs, e.g., 4 values, 5 values, etc. may be implemented without departing from the scope of the present disclosure.

The obtained values and/or data for each image in a segment can then be combined based on a suitable algorithm (to be described in greater detail below) to render a summary or representation for the segment under consideration. Statistical testing can then be performed for each segment against specific criteria for that segment and the quality assessment of the segment based on the results of the statistical tests. Such processing will also be described in greater detail below.

Because segments, sub-segments, and samples are documented and associated with temporal and/or spatial aspects of the process (i.e. temporally segmented), the location of any failure or flaw during the process can be traced back to a specific location on workpiece 100 and a specific time point in the process.

One of skill in the art will recognize that one or more sensors 20, 21 can be implemented with different segmentation strategies, image processing, and statistical analysis each based upon an actual physical behavior of a defect that is targeted for detection (e.g., blow holes, spatter, etc.)

Figure 3:
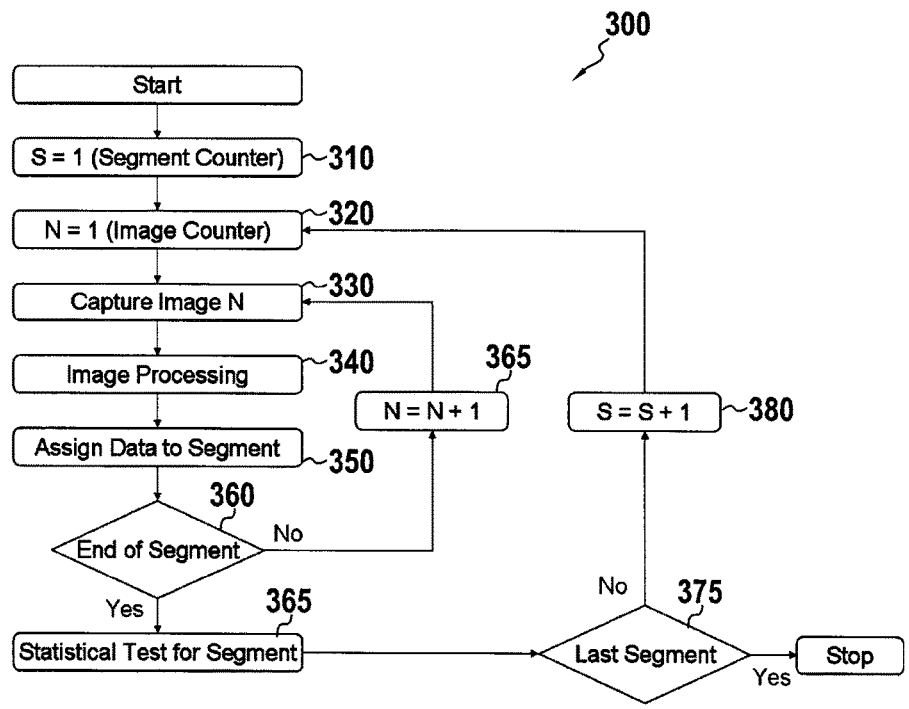
FIG. 3 is an exemplary flowchart highlighting a method for an exemplary image processing for evaluating at least one state of a process.

FIG. 3 is an exemplary flowchart 300 describing an algorithm for a portion of a method for evaluating at least one state of a process where, for example, a single sensor is used. One of skill in the art will understand that additional sensors may be processed in similar manner.

As described above, a user may first define a number of segments and or sub-segments to be associated with the process. Further, a user may define a number of samples (e.g. images, sounds, etc.) to be obtained with regard to each segment and/or sub-segment.

In FIG. 3, segments, indicated by S, and samples, indicated by N, are captured and processed according to algorithms in accordance with the present disclosure. Importantly, while FIG. 3 is described in the context of an image sampling process, one of skill in the art will understand that any samples may be processed similarly to the images as described with regard to FIG. 3.

As an initial step, both a segment counter and a sample counter may be set to 0 or 1 to begin from a first segment monitored during a process (Steps 310 and 320). Within the segment, an image may be sampled (step 330), for example, using one or more sensors 20, 21 and providing data therefrom to processor 5.

According to some embodiments of the disclosure, the sampled image N may be processed at the time of capture (step 340) and the processed data assigned to the segment S (step 350). Alternative, the sample may be immediately assigned to the segment S (step 350), with processing to take place once all the samples and segments have been completed.

Processor 5 may then determine whether, based on the sample captured, the predefined number of samples for a segment have been fulfilled (step 360). If the number of samples captured for the segment has not yet reached the predefined number of samples (step 360: no) the sample counter may be incremented (step 365) and the next sample captured (step 330). When processor 5 determines the number of predefined samples for the segment have been captured (step 360: yes), according to some embodiments statistical analysis may then be performed on the samples within the segment (step 365). Alternatively, such statistical analysis may be carried out at the end of the process following completion of the monitoring, and processor five may instead determine whether the number of segments fulfilled have reached the predetermined number of segments (step 375). Where the number of segments fulfilled has not yet reached the predetermined number of segments (step 375: no) the segment counter may be incremented (step 380) and the process returned to step 320 where the sample counter is reset to 1, and capturing of images begins again for the current segment. When the number of segments has fulfilled the predetermined number of segments (step 375: yes) and/or the process has completed, the algorithm is terminated.

Figure 4A:
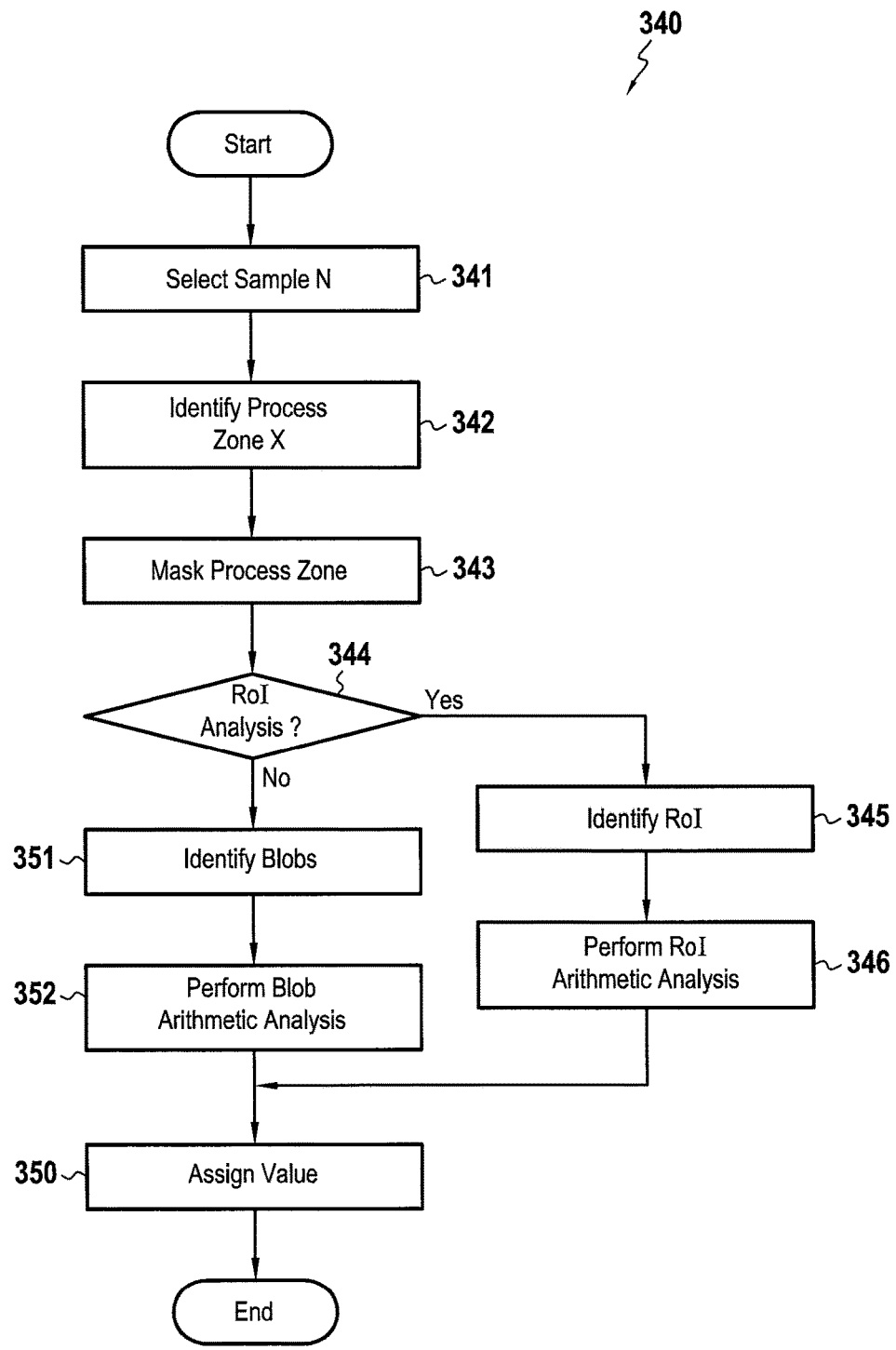
FIG. 4A is an exemplary flowchart depicting an exemplary algorithm associated with image processing.
Figure 4B:
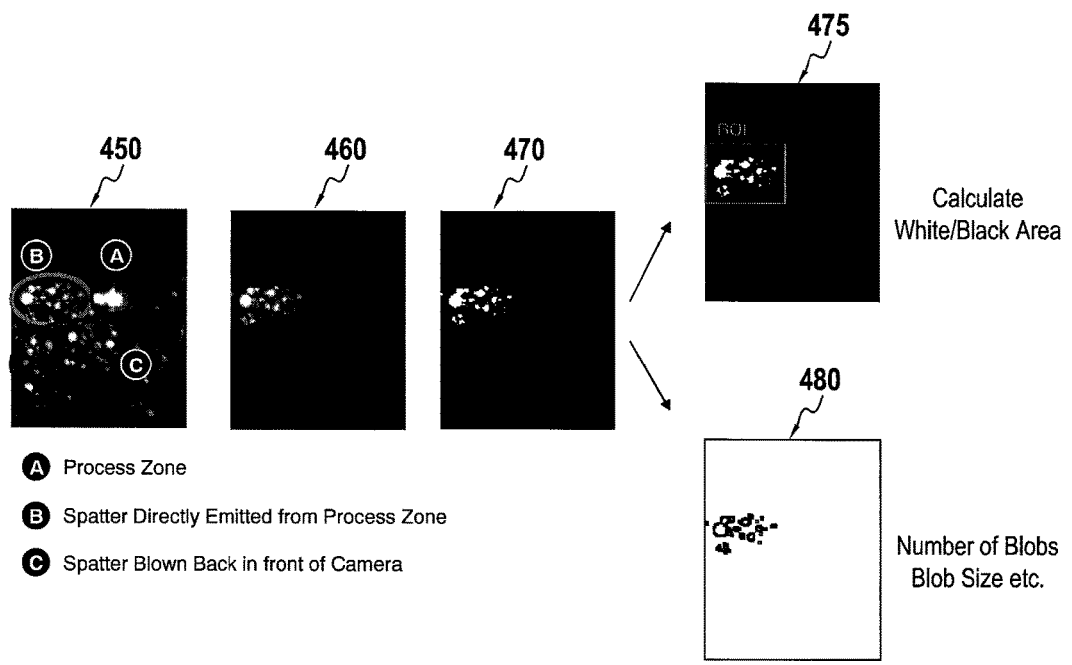
FIG. 4B is an exemplary image processing approach for spatter detection.
Figure 4C:
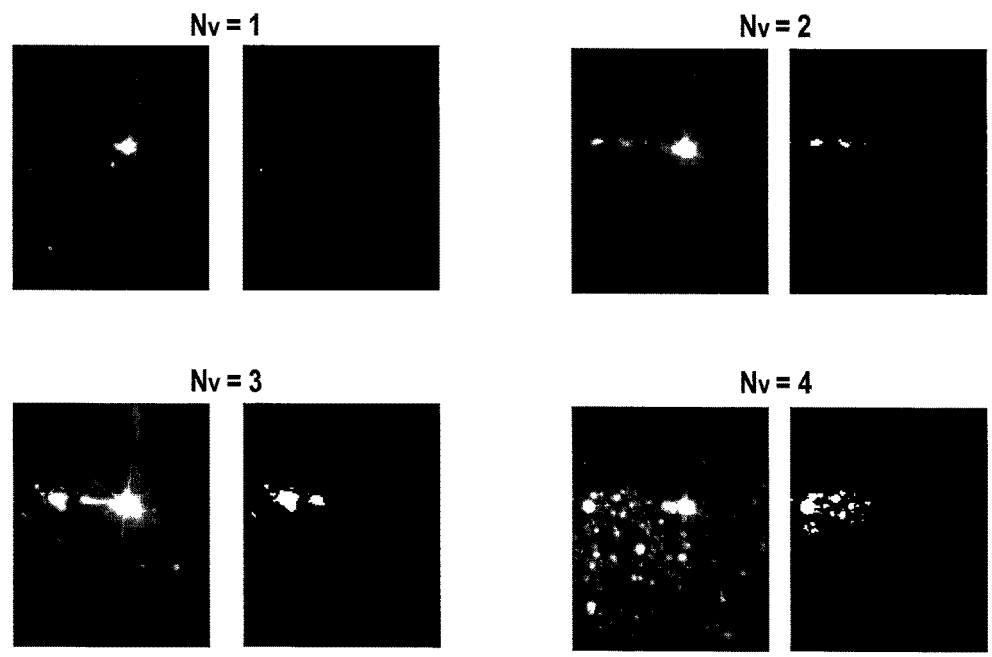
FIG. 4C is an exemplary process output for the spatter detection.

FIG. 4A is an exemplary flowchart depicting an exemplary algorithm associated with image processing step 340 of FIG. 3. FIG. 4A will be described using the aid of FIGS. 4B-4C for further clarification. FIG. 4B is an exemplary image processing approach for spatter detection, while FIG. 4C is an exemplary numerical output for the processing related to spatter detection. As noted above spatter detection is just one exemplary defect, and one of skill in the art will understand that other defects may be processed in a similar manner.

According to the exemplary algorithm, and depending on whether processing is undertaken after the capture of each sample, following completion of a segment, and/or following capture of all samples, a sample is selected for processing by way of its sample number N (step 341), for example, sample N shown at element 450 of FIG. 4B.

Once a particular sample has been selected, processor 5 may identify a process zone A (step 342) based on, for example, information provided by the user during set up and or information obtained during processing of workpiece 100. As shown at FIG. 4B, element 450 a process zone A may be identified in sample N. Further, processor 5 may identify zones B and C, which comprise spatter either directly emitted from the process zone A or spatter blown back in front of the camera. Processor 5 may then, based on this information, establish a mask for delimiting these areas (step 343). An example of such a mask configuration shown at element 460 of FIG. 4B.

As noted above, during set up of the system 200 a user may set certain thresholds related to defect identification and/or such thresholds may be determined by processor 5 based on iteration through data related to defects provided to processor 5 by various methods. Such a threshold may then be used as shown at element 470 FIG. 4B for comparing sample N at mask 460 (e.g., pixels above a certain value are made white, while those below a certain value are made black. If a user has selected, for example, region of interest analysis (step 344: yes) processor 5 may identify a region of interest (step 345) based on previously determined thresholds as shown in element 475 of FIG. 4B.

In order to then determine a numerical value for sample N, and arithmetic determination may be made, for example, calculating the ratio of white to black area in sample N (step 346). FIG. 4C depicts numerical value outcomes based on such a ratio calculation, and includes an exemplary original sample and its associated masked threshold. For example, a case where no spatter is determined may result in a numerical value of 1 may be assigned (step 355).

Exemplary numerical values, based on an exemplary analysis are shown at FIG. 4C. For example, numerical values for levels of spatter calculated according to the arithmetic white to black area ratios, may be $N_v=1$ for a determination of no spatter, $N_v=2$ for a minor spatter event, $N_v=3$ for a major spatter event, and $N_v=4$ for a massive spatter event. One of skill will understand that additional methods may be used for determining numerical values associated with each sample N.

For example, blob detection may be used instead of or in conjunction with, region of interest analysis. Processor 5 may therefore, identify blobs within sample N (step 350) as shown at element 480 of FIG. 4B. Following the identification of blobs in sample N, processor 5 may perform an arithmetic analysis related to blobs (step 351) for example, determining the number of blobs, blob sizes, and blob size ratios. Processor 5 may then, similarly with regard to region of interest analysis described above, assign a numerical value for sample N (step 355). In addition, comparison between images can also provide information related to the blob, e.g., velocity (speed and direction) and tracking capability.

After the image processing at step 340 is completed, and the value of all samples 1 . . . N have been assigned to segments 1 . . . S respectively, statistical processing may be undertaken for determination of at least one state of the process.

Figure 4D:
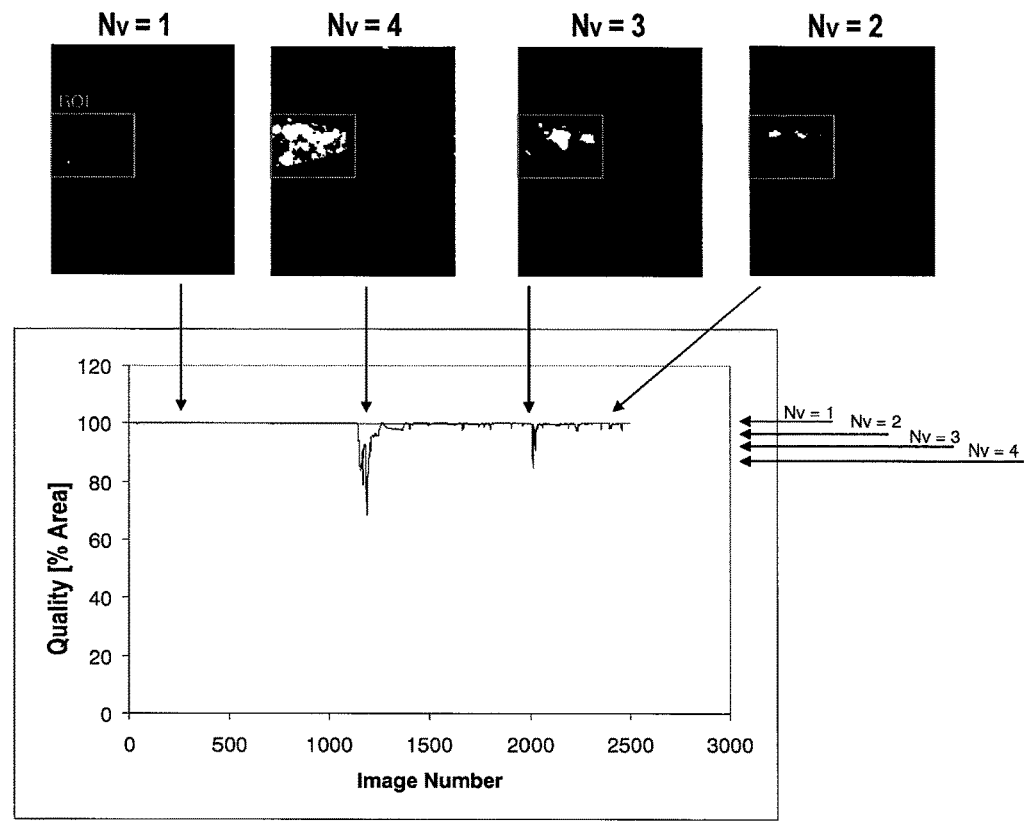
FIG. 4D-4F are exemplary graphs depicting spatter analysis based on a threshold values at particular sampling rates.
Figure 4E:
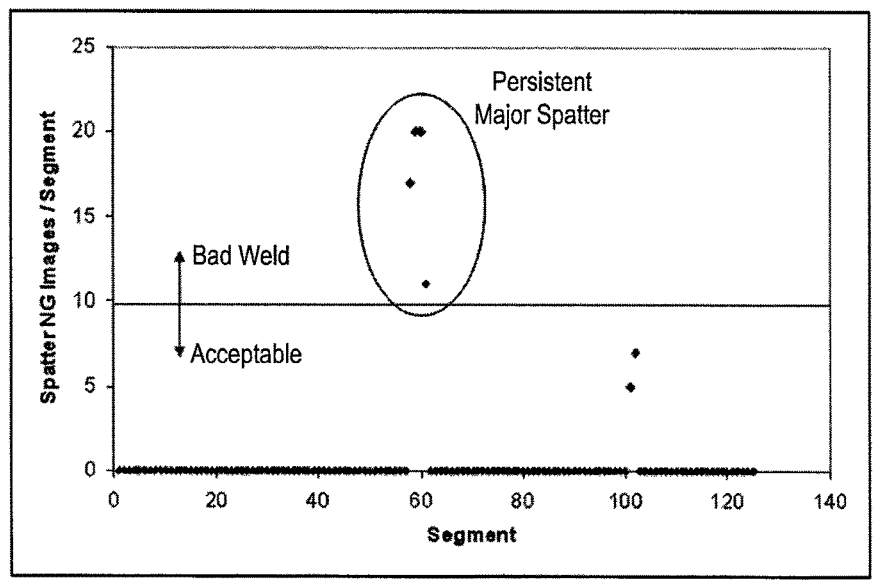
Figure 4F:
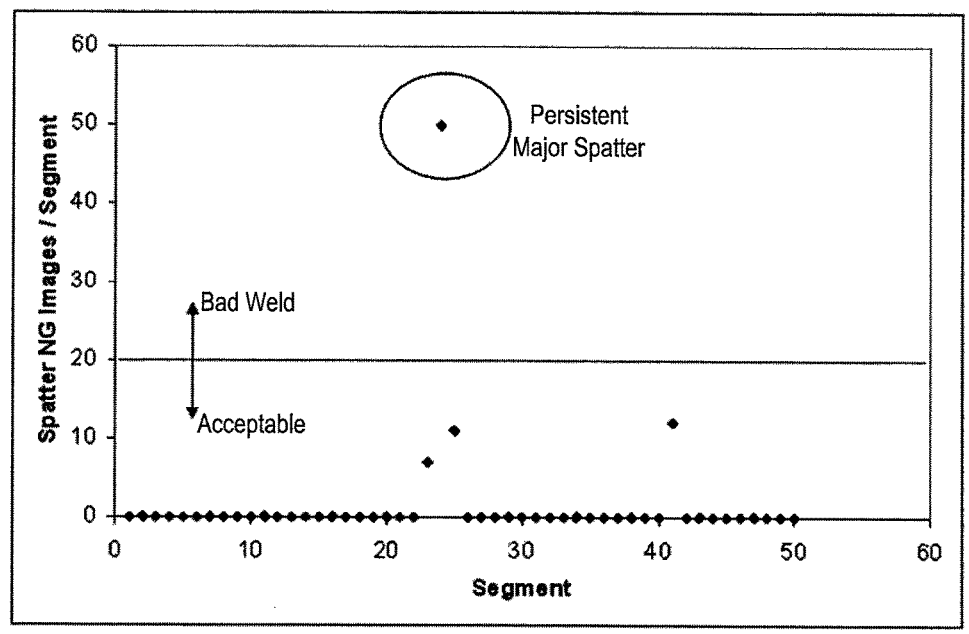

For example, as shown at FIGS. 4D-4F, values associated with each sample N assigned to a segment S may be combined using and averaging algorithm for purposes of determining a single value associated with the segment (e.g., percent area of a weld). Alternatively, another process may be applied such as hypothesis testing, distribution analysis, scatter analysis, cluster analysis, and patterning of passive failed states within a segment, among others, to arrive at a single value for a segment.

These values may then be plotted on a graph against a threshold value indicating success or failure state of the process, for example a good weld or a bad weld with excessive amounts of spatter as determined by, for example, amount of spatter and temporal persistence of the spatter event. As shown at FIG. 4D, a threshold of, for example, 90 percent by area may be set for a process zone.

Additionally, results may be compared between higher and lower sampling rates to determine whether the current statistical analysis is sufficiently accurate for purposes of the process under consideration.

Based on the outcome of such an analysis, processor 5 may render a determination of the state of the process, and quality associated therewith. Such a determination may be based on threshold values for a maximum amount of spatter occurrences, for example, and/or other suitable criteria. For example, where welds presenting spatter affecting greater than 10 percent of the process area occurs over a portion of the weld greater than 200 samples based on a sample rate of 50 samples per segment, processor 5 may determine a state of the process indicating that a particular portion of workpiece 100 is unacceptably assembled and process state deemed failed (e.g., bad weld). Then, based on the temporal segmentation, and recorded images, a user may inspect workpiece 100 and determine how to improve the process to avoid such spatter in the future, for example. FIG. 4E depicts a visualization of such a determination in graphical format, while FIG. 4F depicts a situation where a threshold level of unacceptable weld quality may not warrant labeling of the process state as failed (e.g., acceptable weld) despite the presence of some defects.

Example: Full Penetration Keyhole Detection

An approach similar to that used with regard to spatter detection can also be used for isolating full-penetration keyholes in a welding process. In this example, a dark keyhole in an image sample is isolated for purposes of measuring its size and marking it in the original image so that a user may view what has been detected (FIG. 5A, FIG. 5B, FIG. 5C, and FIG. 5D).

Figure 5A:
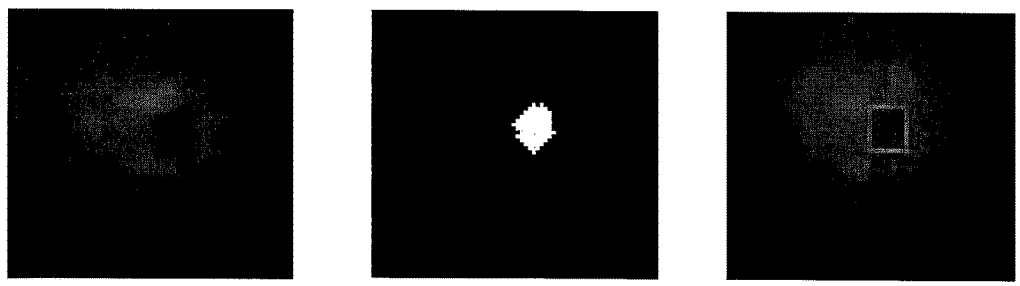
FIG. 5A is an exemplary image series depicting stages of identifying a keyhole occurrence in a weld and marking its appearance in the original image.
Figure 5B:
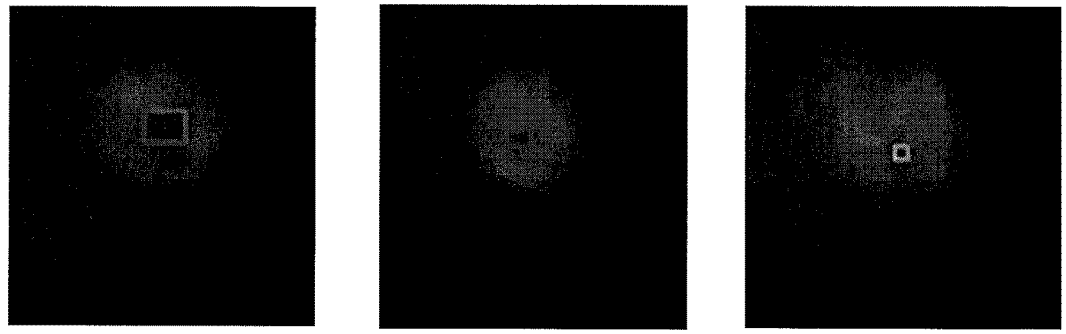
FIG. 5B is an exemplary series of images showing artifact grading based on artifact size.

FIG. 5A is an exemplary image series depicting stages of identifying a keyhole occurrence in a weld and marking its appearance in the original image, while FIG. 5B is an exemplary series of images showing artifact grading based on artifact size.

Figure 5C:
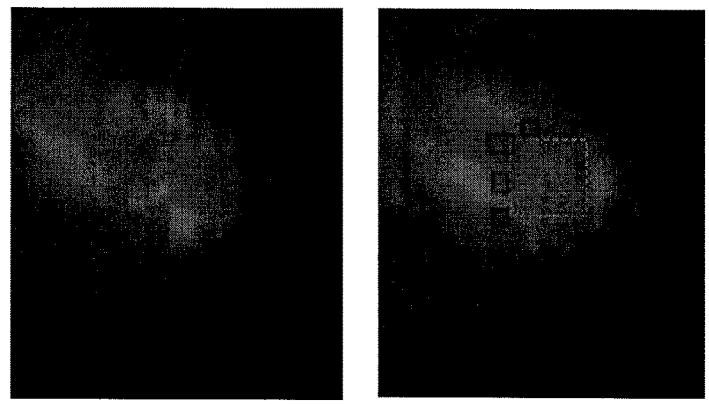
FIG. 5C is an exemplary series of images showing exclusion of multiple artifacts based on their size and position

FIG. 5C shows an exemplary series of images showing exclusion of multiple artifacts based on their size and position (centre point) relative to the expected or statistically likely position of a keyhole artifact are shown. This is desirable for at least the reason that such artifacts can exist even inside a masked region of an image.

Figure 5D:
FIG. 5D is an exemplary "non-detection" case between an original image and an analyzed image.

FIG. 5D is an exemplary "non-detection" case between an original image and an analyzed image.

The image-processing algorithm was first used to sample many full-penetration welds and many partial penetration welds to determine a typical size profile for noise/false detections and the full-penetration keyhole.

Figure 6:
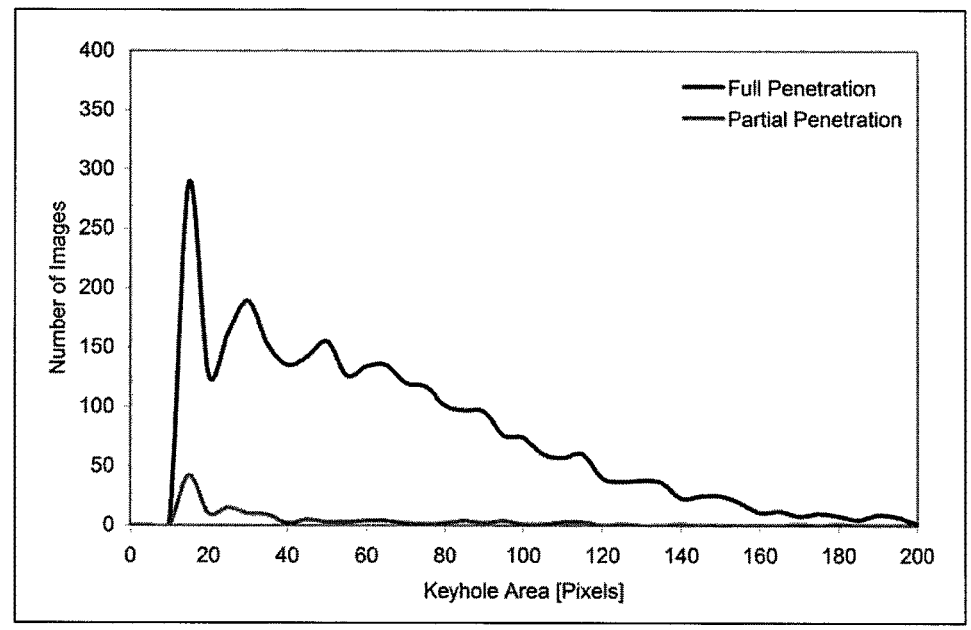
FIG. 6 is an exemplary graph highlighting a typical size profile for noise/false detections and a full-penetration keyhole.

The absolute results were dependent on the optical setup and the sensor used, but in general graphs can be generated that show a significant difference (such as that shown in FIG. 6). This difference was used as a threshold to create a binary output for the presence or lack thereof of the full-penetration keyhole (for example, an anomaly greater than 30 or 40 pixels has a high statistical chance of being a keyhole).

However, even with this threshold in place, detection of non-penetration keyhole states can still occur when the resulting weld is a full-penetration weld. In fact, an oscillation between states can be observed. It is therefore useful to use a segmentation approach by which consideration of how many images in a group of images have the apparent full-penetration state.

Figure 7:
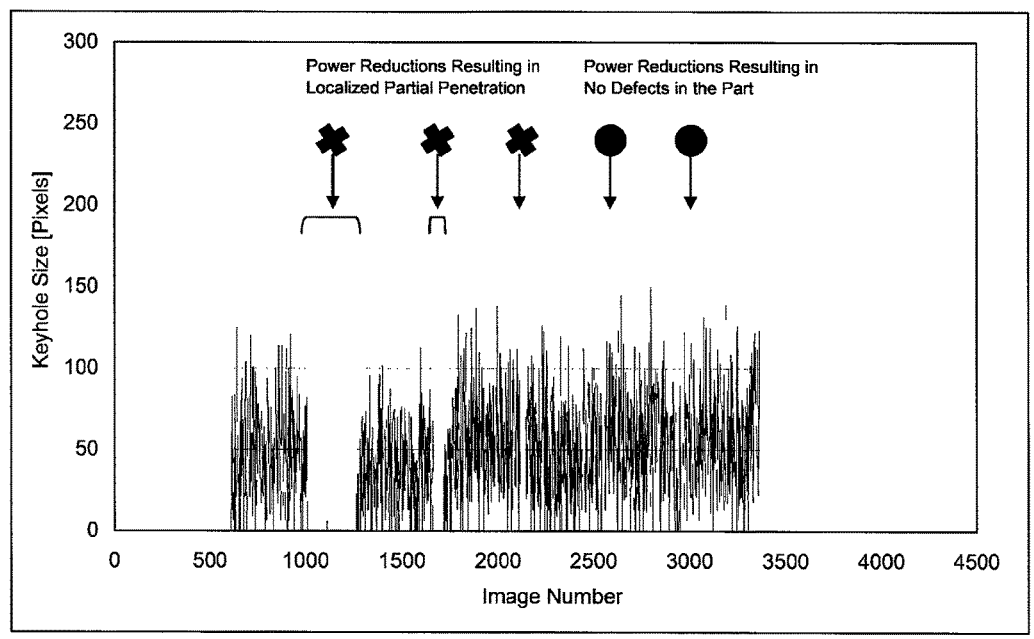
FIG. 7 is an exemplary graph depicting keyhole area distributions over segments where laser power was intentionally cycled.

To illustrate this problem, FIG. 7 shows an image-by-image analysis for keyhole size in a process programmed with intentional laser power fluctuations that caused the weld to only partially penetrate at known time intervals. Physical inspection of the final weld showed that partial penetration occurred at three locations marked by crosses in FIG. 7.

Figure 8:
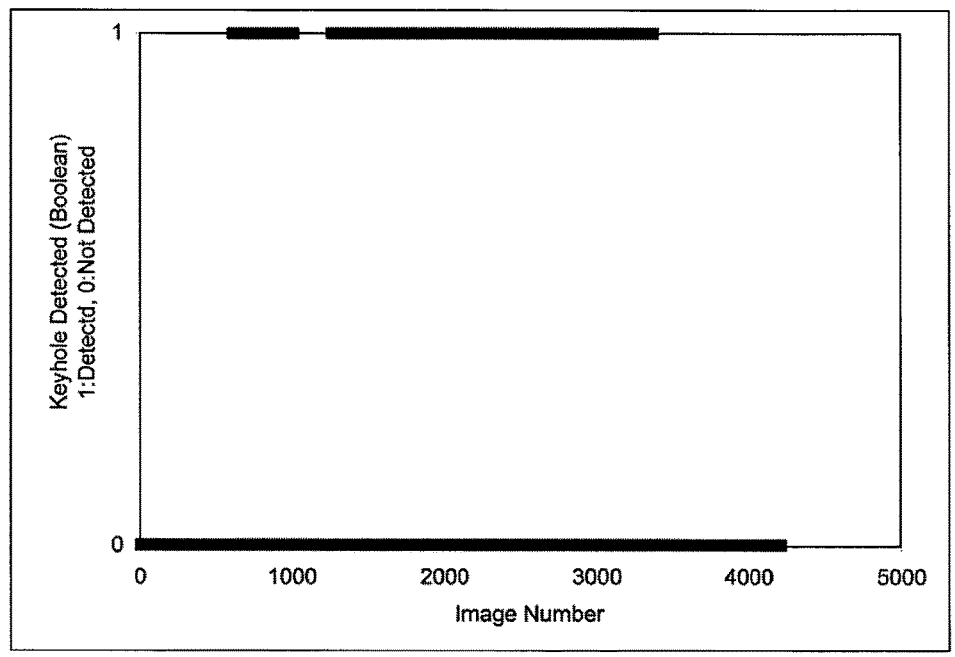
FIG. 8 shows a binary output from a Boolean analysis of FIG. 7 based on a keyhole size threshold of 30 pixels.

FIG. 8 shows a binary output from this analysis based on a keyhole size threshold of 30 pixels. In FIG. 8, non-penetration states can be seen to persist in the full-penetration region of the weld.

Figure 9:
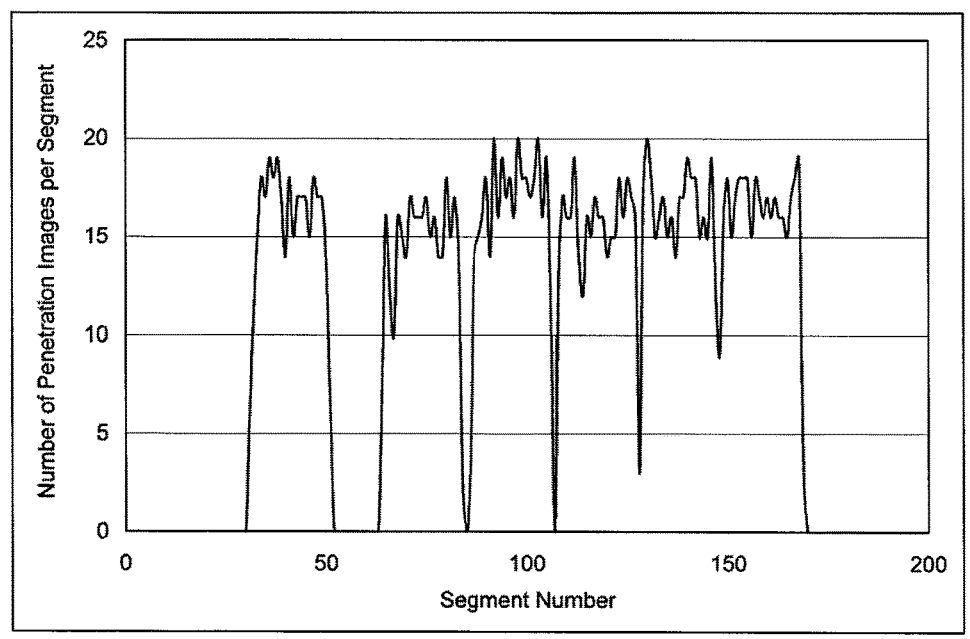
FIGS. 9 and 10 are exemplary graphs showing penetration events over the course of segment samples at different sampling rates per segment.
Figure 10:
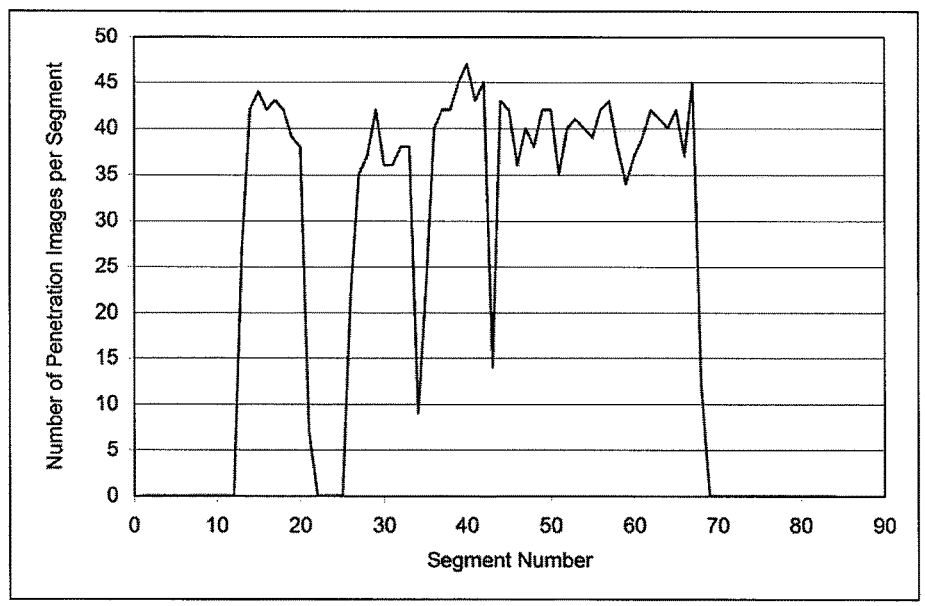

In order to clarify the state of the weld, image segmentation according to the present invention was applied as shown in FIG. 9 (20 images per segment) and FIG. 10 (50 images per segment).

For this specific joint, process conditions, image capture and processing strategy, 50 images per segment allowed detection of the non-penetration states in the physical weld. At 20 images per segment no noticeable physical effects were noted on the weld itself, corresponding with the two additional minima shown at FIG. 9 (not present in FIG. 10).

This approach can be used to ensure that a full penetration weld is formed consistently along a weld seam, depending on joint geometry, which is particularly useful to ensure full joint strength along the weld seam, and no partially welded sites that could act as stress concentrations and failure sites under static and dynamic loading.

The approach can also be useful to ensure that a partial penetration state is intentionally formed consistently along a weld seam, depending on joint geometry. This could be important, for example, in the sealing of containers with sensitive contents where laser penetration and melt ejection inside the container is undesirable.

The approach is particularly useful not only for automating detection but also for enabling detection of the penetration state when no visual access to the underside of the joint is possible.

As noted above, one of skill in the art will understand that systems and methods described herein may be equally applicable to other samples. For example, it may be desirable to utilize an ultrasonic system for detecting defects in certain assembly processes. The systems and methods herein may therefore sample ultrasonic emissions and apply algorithms thereto for arriving at a process state determination.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method for evaluating at least one state of an assembly process of a work piece, comprising:
    segmenting the assembly process on a spatial basis into a plurality of process segments;
    capturing information related to each process segment of the plurality of process segments, the information comprising a plurality of samples captured during the assembly process at a predetermined temporal frequency;
    processing the plurality of samples related to each segment of the plurality of process segments such that numerical data associated with each sample is generated;
    performing a statistical analysis on the numerical data to generate a plurality of process values wherein each process value is associated with one of the samples;
    determining whether the process values exceed a threshold value;
    determining one or more physical defects in the work piece as a result of the assembly process when one or more process values exceeds a threshold value; and
    in response to a determination that one or more of the plurality of process values exceeds the threshold, labelling the work piece for disposal as having failed the assembly process, based on the one or more physical defects determined.

2. The method according to claim 1, further comprising sub-segmenting each of the plurality of process segments into a plurality of sub-segments.

3. The method according to claim 1, further comprising, specifying a set of parameters defining at least one of the plurality of segments, the samples, and the process.

4. The method according to claim 1, wherein the processing comprises applying one or more algorithms to the plurality of samples to result in data points.

5. The method according to claim 4, wherein the one or more algorithms are selected from at least one of a maximum determining algorithm, a minimum determining algorithm, an average determining algorithm, a slope determining algorithm, an integral algorithm, a summing algorithm, logic actions, masking functions, local thresholding, global thresholding, adaptive thresholding, inversing the image, filling parts of the image, opening parts of the image, and noise spot removal.

6. The method according to claim 1, wherein a number of segments comprising the plurality of segments is configured based on the process being analyzed.

7. The method according to claim 1, further comprising a user configuration step, wherein a user may configure at least one of the number of segments and a statistical state associated with a physical defect.

8. The method according to claim 1, wherein the process includes at least one of assembly process, a composite curing process, a composite consolidating process, a powder cladding process, a powder spray process, a spray process, a brazing process, a composite tape laying process, a composite comingled fibre placement process, a heating and drying process.

9. The method according to claim 1, wherein the process is a welding process.

10. A system for evaluating at least one state of an assembly process of a work piece, the system comprising:
    a processor configured to segment the assembly process on a spatial basis into a plurality of process segments;
    one or more sensors configured to capture information related to each process segment of the plurality of process segments generated by the processor, the information comprising a plurality of samples captured during the assembly process at a predetermined temporal frequency;
    wherein the processor is further configured to:
    process the plurality of samples related to each process segment of the plurality of segments such that numerical data associated with each sample is generated,
    perform a statistical analysis on the numerical data to generate a plurality of process values wherein each process value is associated with one of the samples,
    determine whether the process values exceed a threshold value;
    determining one or more physical defects in the work piece as a result of the assembly process when one or more process values exceeds a threshold value; and
    in response to a determination that one or more of the plurality of process values exceeds the threshold, label the work piece for disposal as having failed the assembly process, based on the one or more physical defects determined.

11. The system according claim 10, wherein output associated with the processing of each sample of the plurality of samples comprises a single numeric value.

12. The system according to claim 11, wherein an output associated with the processing of each segment of the plurality of process segments is a function of the single numeric value.

13. The system according to claim 10, further comprising a database comprising anomaly data associated with one or more predetermined anomalies.

14. The system according to claim 10, wherein the one or more sensors comprises a camera and/or a microphone configured to capture radiation data.

15. The system according to claim 10, wherein the plurality of samples comprise at least one of an image and a sound.

16. The system according to claim 10, further comprising a band pass filter configured to selectively transmit radiation data within a predetermined wavelength or group of wavelengths and to prevent transmission of radiation data outside of the predetermined wavelength.

17. The system according to claim 10, further comprising a user interface, the user interface being configured to enable customization of a set of parameters defining at least one of the plurality of segments, the samples, and the process.

18. The system according to claim 10, wherein the one or more sensors is configured to capture images in three-dimensions.

19. The system according to claim 13, wherein the database further comprises comparative data related to the plurality of samples based on one or more algorithms.

20. The system according to claim 10, further comprising a storage device configured to store one or more of the plurality of samples captured during the process, and for outputting one or more of the plurality of samples in a format visible and/or audible to a human user.

21. A system for evaluating at least one state of an assembly process of a work piece, the system comprising:

a processor configured to segment the assembly process on a spatial basis into a plurality of process segments;

one or more sensors configured to capture information related to each process segment of the plurality of process segments generated by the processor, the information comprising a plurality of samples captured during the assembly process at a predetermined temporal frequency, wherein a trigger between process start/stop and data capture start/stop initiates and synchronizes a position of the work piece and said process segments;

wherein the processor is further configured to:

process the plurality of samples related to each process segment of the plurality of segments such that numerical data associated with each sample is generated, perform a statistical analysis on the numerical data to generate a plurality of process values wherein each process value is associated with one of the samples, determine whether the process values exceed a threshold value;

determining one or more physical defects in the work piece as a result of the assembly process when one or more process values exceeds a threshold value; and in response to a determination that one or more of the plurality of process values exceeds the threshold, label the work piece for disposal as having failed the assembly process, based on the one or more physical defects determined, wherein a position of a said one or more physical defects on said work piece is determined based on said synchronization of position and data capture.

* * * * *